(12) United States Patent
Huang et al.

(10) Patent No.: US 9,469,743 B2
(45) Date of Patent: Oct. 18, 2016

(54) COMPOSITE MATERIAL WITH CONDUCTIVE AND FERROMAGNETIC PROPERTIES AND HYBRID SLURRY

(75) Inventors: Ying-Ting Huang, Houlong Township, Miaoli County (TW); Mu-Jen Young, Zhudong Township, Hsinchu County (TW); Jinn-Jong Wong, Hsinchu (TW); Guang-Way Jang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1183 days.

(21) Appl. No.: 13/480,271

(22) Filed: May 24, 2012

(65) Prior Publication Data

US 2013/0146801 A1 Jun. 13, 2013

(30) Foreign Application Priority Data

Dec. 9, 2011 (TW) .............................. 100145512 A

(51) Int. Cl.
*C01G 49/02* (2006.01)
*H01B 1/12* (2006.01)
(Continued)

(52) U.S. Cl.
CPC .................. *C08K 3/22* (2013.01); *B82Y 30/00* (2013.01); *C01G 49/02* (2013.01); *C01G 49/08* (2013.01); *C08L 79/02* (2013.01); *C09J 163/00* (2013.01); *C01P 2002/72* (2013.01);
(Continued)

(58) Field of Classification Search
CPC .............. C08K 2003/2265; C08K 2003/2268; C08K 2003/2272; C08K 2003/2275; C08K 3/22; H01B 1/12; C01G 49/02

USPC .................................. 252/62.54, 500, 521.2
See application file for complete search history.

(56) References Cited

U.S. PATENT DOCUMENTS 5,264,157 A * 11/1993 Bidan .................. C08G 61/124
252/519.21
5,567,355 A * 10/1996 Wessling ................ C08F 38/02
252/500

(Continued)

FOREIGN PATENT DOCUMENTS

CN 1243849 A 2/2000
CN 1515629 A 7/2004

(Continued)

OTHER PUBLICATIONS

Sun. The synthesis and characterization of electrical and magnetic nanocomposite: PEDOT/PSS—Fe3O4.Materials Chemistry and Physics 118 (2009) 288-292.*

(Continued)

*Primary Examiner* — Matthew E Hoban
(74) *Attorney, Agent, or Firm* — Birch, Stewart, Kolasch & Birch, LLP

(57) ABSTRACT

In one embodiment of the disclosure, a composite material with conductive and ferromagnetic properties is provided. The composite material includes: 5 to 90 parts by weight of a conductive polymer matrix; and 0.1 to 40 parts by weight of iron oxide nanorods, wherein the iron oxide nanorods are ferromagnetic and have a length-to-diameter ratio of larger than 3. In another embodiment, a hybrid slurry is provided. The hybrid slurry includes a conductive polymer, and iron oxide nanorods, wherein the iron oxide nanorods are ferromagnetic and have a length-to-diameter ratio of larger than 3; and a solvent.

10 Claims, 8 Drawing Sheets

(51) Int. Cl.
*C08K 3/22* (2006.01)
*C08L 79/02* (2006.01)
*C01G 49/08* (2006.01)
*C09J 163/00* (2006.01)
*B82Y 30/00* (2011.01)
*C08L 65/00* (2006.01)

(52) U.S. Cl.
CPC ...... *C01P 2004/03* (2013.01); *C01P 2004/16* (2013.01); *C01P 2006/40* (2013.01); *C01P 2006/42* (2013.01); *C08G 2261/3221* (2013.01); *C08G 2261/3223* (2013.01); *C08G 2261/3422* (2013.01); *C08G 2261/51* (2013.01); *C08K 2003/2265* (2013.01); *C08K 2003/2272* (2013.01); *C08K 2003/2275* (2013.01); *C08L 65/00* (2013.01)

(56) References Cited

U.S. PATENT DOCUMENTS

| | | | |
|---|---|---|---|
| 5,750,249 | A | 5/1998 | Walther et al. |
| 5,938,979 | A * | 8/1999 | Kambe ............ H01F 1/36 174/126.2 |
| 6,764,617 | B1 * | 7/2004 | Viswanathan ......... B82Y 25/00 250/515.1 |
| 6,967,236 | B1 | 11/2005 | Angelopoulos et al. |
| 7,014,971 | B2 | 3/2006 | Skorokhod et al. |
| 7,829,140 | B1 | 11/2010 | Zhong et al. |
| 8,277,690 | B2 * | 10/2012 | Dhawan ............ H01B 1/124 252/500 |
| 8,409,463 | B1 * | 4/2013 | Perez ............ A61K 49/1863 252/62.54 |
| 2006/0141149 | A1 | 6/2006 | Chen et al. |
| 2006/0266982 | A1 | 11/2006 | Su et al. |
| 2007/0029195 | A1 | 2/2007 | Li et al. |
| 2007/0051928 | A1 | 3/2007 | Horton |
| 2010/0270517 | A1 | 10/2010 | Hong et al. |
| 2011/0104073 | A1 | 5/2011 | Zeng et al. |
| 2011/0291032 | A1 | 12/2011 | Sun et al. |

FOREIGN PATENT DOCUMENTS

| | | |
|---|---|---|
| CN | 101282635 A | 10/2008 |
| CN | 101514282 A | 8/2009 |
| CN | 101525436 A | 9/2009 |
| CN | 101605447 A | 12/2009 |
| CN | 101664668 A | 3/2010 |
| CN | 102110508 A | 6/2011 |
| EP | 0047368 A1 | 3/1982 |
| JP | 2010-147079 A | 7/2010 |
| KR | 10-2004-0097566 A | 11/2004 |
| TW | I271876 B | 1/2007 |
| TW | I329326 B | 8/2010 |
| WO | WO 2007/050467 A1 | 5/2007 |

OTHER PUBLICATIONS

Chen. Synthesis, magnetic and electromagnetic wave absorption properties of porous Fe 3 O 4 / Fe / SiO 2 core/shell nanorods. Journal of Applied Physics 106, 054303 (2009).*
Wang. Magnetic and microwave absorbing properties of polyaniline/g-Fe2O3 nanocomposite. Journal of Magnetism and Magnetic Materials 320 (2008) 2132-2139.*
Zhang. Electromagnetic functionalized polyaniline nanostructures. Nanotechnology 16 (2005) 2827-2832.*
Chinese Office Action dated Sep. 3, 2014, issued in corresponding Chinese PatentApplication No. 201110461182.9.
Syue-Al Li; The preparation of Fe3O4 base materials and research of the electromagnetic performance of its thin film complex; Engineering Science and Technology I (Journal); published on Jul. 15, 2011.
China Office Action for Appl. No. 201110461182.9 dated May 5, 2015.
Dai, J.T. et al, "Preparation, Conductivity, and Magnetic Properties of Pt3Co-PEDOT/PSS Nanocomposite," Acta Chimica Sinica, Nov. 28, 2007, vol. 65, No. 22, pp. 2522-2526.
Taiwan Office Action for Appl. No. 100145512 dated Jun. 25, 2014.

* cited by examiner

COMPOSITE MATERIAL WITH CONDUCTIVE AND FERROMAGNETIC PROPERTIES AND HYBRID SLURRY

CROSS REFERENCE TO RELATED APPLICATIONS

This Application claims priority of Taiwan Patent Application No. 100145512, filed on Dec. 9, 2011, the entirety of which is incorporated by reference herein.

TECHNICAL FIELD

The present disclosure relates to a composite material, and in particular relates to a composite material with conductive and ferromagnetic properties, and a hybrid slurry containing the same.

BACKGROUND

Electro-magnetic interference (EMI) is a kind of electrical pollution which has been recently discovered. Advances in technology have caused increased electro-magnetic radiation in populated environments. When the electro-magnetic radiation is not shielded effectively, it might interfere with daily communications and result in inaccurate analysis of various electronic instruments, or even endangering human health. Therefore, there is an increasing demand for a material with high electro-magnetic interference shielding ability.

Electro-magnetic radiation is mainly caused by an electrical field and a magnetic field perpendicular to each other. Therefore, the electro-magnetic interference shielding may be divided into electrostatic field shielding and magnetostatic field shielding. The electrostatic field shielding is performed by using electric charges on the surface of a metal to offset the electrical field inside the metal. On the other hand, the magnetostatic field shielding is performed by using a ferromagnetic material with high magnetic permeability to provide a low-resistant path, such that magnetic force line can be conducted through or reach the shielding material. In other words, the electro-magnetic interference shielding principles can work by reflection loss and absorption loss. A highly electrical conductive material has low volume resistance and thus has high reflection loss. A hysteresis loop of a magnetic material depends on its saturated magnetization and coercivity. The higher the saturated magnetization and coercivity are, the larger the encapsulation surface of the hysteresis loop is, resulting in higher energy loss and higher electro-magnetic interference shielding ability.

Metallic materials with high electrical conductivity are commonly used EMI materials. However, the metallic materials are usually heavy, highly corrodible, and have high hardness.

Although materials having both conductive and ferromagnetic properties have been developed, they are not satisfactory in all aspects. For example, nanocomposites do not possess sufficient conductive or ferromagnetic properties or are difficult to process due to poor dispersity.

Therefore, a novel EMI material with high conductive and ferromagnetic properties which is light, easy to process, flexible, or incorrodible is desired.

SUMMARY

An embodiment of the disclosure provides a composite material with conductive and ferromagnetic properties, including: 5 to 90 parts by weight of a conductive polymer matrix; and 0.1 to 40 parts by weight of iron oxide nanorods, wherein the iron oxide nanorods are ferromagnetic and have a length-to-diameter ratio of larger than 3.

Another embodiment of the disclosure provides a hybrid slurry, including: a conductive polymer; iron oxide nanorods, wherein the iron oxide nanorods are ferromagnetic and have a length-to-diameter ratio of larger than 3; and a solvent.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
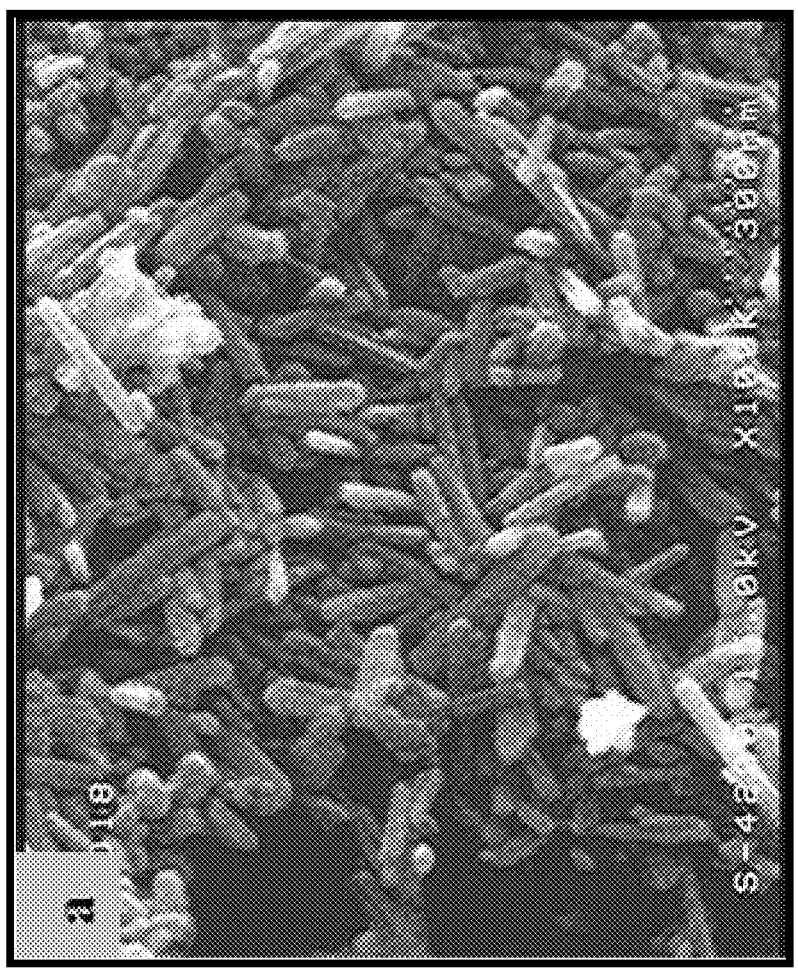
FIG. 1 illustrates an SEM diagram of iron oxide nanorods according to one example of the disclosure.

The following description is of the best-contemplated mode of carrying out the invention. This description is made for the purpose of illustrating the general principles of the invention and should not be taken in a limiting sense. The scope of the invention is best determined by reference to the appended claims.

In one embodiment, a hybrid slurry with conductive and ferromagnetic properties is developed by using an organic-inorganic hybrid technique. The hybrid slurry can further be processed and molded to form a nano-composite material. A length-to-diameter ratio of iron oxide in the composite material may be adjusted to form iron oxide nanorods, whereby its ferromagnetic property may be adjusted to achieve good electro-magnetic interference shielding ability.

In another embodiment, a conductive polymer shell may be additionally wrapped outside a surface of the iron oxide nanorods to form a core-shell structure, enhancing the continuity of the ferromagnetic and conductive biphase. Therefore, a hybrid slurry or a composite material made therefrom may have an improved ferromagnetic and conductive properties.

In one embodiment, a hybrid slurry includes iron oxide nanorods, a conductive polymer, and a solvent. In addition, an adhesive may be included in the hybrid slurry. In one embodiment, a length-to-diameter ratio of the iron oxide nanorods is larger than 3. In another embodiment, a length-to-diameter ratio of the iron oxide nanorods is between 5 and 10.

In the hybrid slurry, a weight ratio of the iron oxide nanorods, the conductive polymer, and the adhesive may be 0.01-0.5:1-3:90-98, respectively, and a solid content of the hybrid slurry may be between 0.5% and 90%. In another embodiment, a conductivity of the hybrid slurry may be between 20 μS and 2000 μS.

Examples of the iron oxide nanorods may include $Fe_3O_4$, $\gamma$-$Fe_2O_3$, or combinations thereof. In one embodiment, a diameter of the iron oxide nanorods may be between 10 nm and 100 nm, and the length of the iron oxide nanorods may be between 30 nm and 1000 nm according to the length-to-diameter ratio described previously. In another embodiment, a saturation magnetization of the iron oxide nanorods may be between 2 emu/g and 90 emu/g, and a coercivity of the iron oxide nanorods may be between 0.5 G and 200 G.

Experimental results showed that the magnetic property of the iron oxide nanorods changes with its diameter. The iron oxide nanorods can have a maximum coercivity at a specific particle size, within its single domain range. In addition, the length-to-diameter ratio of the iron oxide nanorods may also affect the magnetic property notably. For example, when the length-to-diameter ratio of the iron oxide nanorods is larger than 5, the iron oxide nanorods may be in the single domain state. Therefore, by adjusting the length-to-diameter ratio of the iron oxide nanorods, materials having different magnetic properties can be obtained. In one embodiment, a length-to-diameter ratio of the iron oxide nanorods is larger than 3. In another embodiment, a length-to-diameter ratio of the iron oxide nanorods is between 5 and 10.

However, it should be noted that an EMI shielding effect is not notable when iron oxide is used alone. For example, a thickness of the shielding material needs to be more than 2 mm to achieve a shielding efficiency of about 19 dB. In other words, when the iron oxide is used solely as the EMI shielding material, a large thickness is required to achieve the desired shielding efficiency. Therefore, in various embodiments of the disclosure, a conductive polymer is also used in a hybrid slurry to achieve the desired EMI shielding ability.

In one embodiment, the conductive polymer may be a polymer with conjugated double bonds, such as polyacetylene, polypyrrole, polythiophene, polyaniline, poly(p-phenylene sulfide, poly(p-phenylene vinylene, poly(3,4-ethylenedioxythiophene, poly(3,4-ethylenedioxythiophene)-polystyrene sulfonate, or combinations thereof. In one embodiment, the conductive polymer is poly(3,4-ethylenedioxythiophene)-polystyrene sulfonate.

It should be noted that although the conductive polymer has some EMI shielding ability per se, its shielding ability is much lower than that of a hybrid slurry combined with conductive polymer and iron oxide nanorods. In other words, the combination of the conductive polymer and the iron oxide nanorods results in a synergic effect for the EMI shielding ability.

In addition, examples of the adhesive used in the slurry may be, for example, polyvinyl alcohol, polyacrylic acid, polyurethane, epoxy resin, polymethylmethacrylate, acrylonitrile butadiene styrene, or combinations thereof. The adhesive is used to increase the adhesion of the resulting composite material with other substances and to increase mechanical strength. Moreover, the solvent used in the slurry may be an aqueous solvent, such as water or a water-based solvent. The aqueous solvent is chosen because the iron oxide nanorods, the conductive polymer, and the adhesive are all water soluble. Therefore, a uniform dispersion in the hybrid slurry can be obtained.

In another embodiment, a conductive polymer shell may be wrapped around a surface of the iron oxide nanorods of the hybrid slurry to form a core-shell structure. In one embodiment, a thickness of the conductive polymer shell is between 5 nm and 50 nm.

The conductive polymer shell may be a polymer with conjugated double bonds, such as polyacetylene, polypyrrole, polythiophene, polyaniline, poly(p-phenylene sulfide, poly(p-phenylene vinylene, poly(3,4-ethylenedioxythiophene, poly(3,4-ethylenedioxythiophene)-polystyrene sulfonate, or combinations thereof. In one embodiment, the conductive polymer shell includes polyaniline.

Experimental results showed that a hybrid slurry including iron oxide nanorods having the conductive polymer shell has improved EMI shielding ability.

In addition, in another embodiment, the hybrid slurry may further be processed to form a composite material. In one embodiment, the hybrid slurry is added into a mold and dried at 30° C. to 80° C. to form a composite material. The composite material may include, for example: 5 to 90 parts by weight of the conductive polymer matrix; 0.1 to 40 parts by weight of iron oxide nanorods; and 0.5 to 85 parts by weight of the adhesive. In one embodiment, the composite material may be formed as a film by various coating processes. Examples of the coating processes include spin coating, bar coating, blade coating, roller coating, wire bar coating, dip coating, or the like. In addition, a surface resistance of the resulting film may be between 1 and 1000 $\Omega/\square$, for example. In another embodiment, a surface resistance of the resulting film may be between 1 and 100 $\Omega/\square$. Moreover, the composite material may be used for EMI shielding, radar/microwave absorption, or electro static discharge (ESD).

Compared to the conventional EMI shielding material such as a material containing only iron oxide, conductive polymer, or iron oxide nano-spheres, the composite material with conductive and ferromagnetic properties according to various embodiments has a better EMI shielding ability. In one embodiment, by using iron oxide nanorods having a length-to-diameter ratio larger than 3 and a conductive polymer material to form a hybrid slurry, the magnetic property and the conductive property can result in a synergic effect. Therefore, a resulting composite material film (including a conductive polymer matrix and iron oxide nanorods with a length-to-diameter ratio larger than 3) can achieve a desired EMI shielding efficiency with a thinner thickness. For example, the film having a thickness of between 20 μm and 30 μm may have an EMI shielding ability reaching 20 dB.

In addition, in another embodiment, a conductive polymer shell may be wrapped around a surface of the iron oxide nanorods to form a core-shell structure. Then, the iron oxide nanorods having the core-shell structure may be mixed with a conductive polymer to form a hybrid slurry or a composite material with EMI shielding ability. Experimental results showed that the composite material including the iron oxide nanorods having the core-shell structure has improved EMI shielding ability. A possible reason for the improved EMI shielding ability may be that the paramagnetic $\alpha$-$Fe_2O_3$ on the surface of the iron oxide nanorods is transformed into the magnetic $Fe_3O_4$ when the conductive polymer shell is wrapped around the surface of the iron oxide nanorods. Therefore, the magnetic property of the entire composite material is improved and the EMI shielding ability is improved as a result.

The thickness of the convention EMI shielding material needs to be larger than 5 mm to achieve an EMI shielding ability of 20 dB (EMI 99%.) However, in various embodiments of the disclosure, the composite material film having

EXAMPLE 1

Synthesis of Iron Oxide Nanorods 0.648 g of $FeCl_3$ was dissolved in 80 ml of water. Then, 0.556 g of the $FeSO_4 \cdot 7H_2O$ was added into the solution and stirred until completely dissolved. Next, under a nitrogen atmosphere, 40 ml of toluene was added into the solution followed by slow addition of 10 ml (20 mM) of cetyltrimethylammonium bromide (CTAB) and 10 ml of ethylenediamine as a surfactant. The solution was stirred for 20 minutes, and then the reaction was continued for 20 hours at 120° C. The resulting product was washed by pure water and then the resulting particles were dispersed into the solution by a sonicator. Composition, shape, and diameter of the resulting nanorod iron oxide were analyzed by a scanning electron microscope (SEM), transmission electron microscope (TEM), and X-ray scattering techniques (XRD).

FIG. 1 illustrates an SEM diagram of the resulting iron oxide nanorods. As shown in FIG. 1, the resulting iron oxide had a rod shape with a width of between 10 nm and 50 nm and a length of between 100 nm and 300 nm. An average of a length-to-diameter ratio was between 5 to 10.

Figure 2:
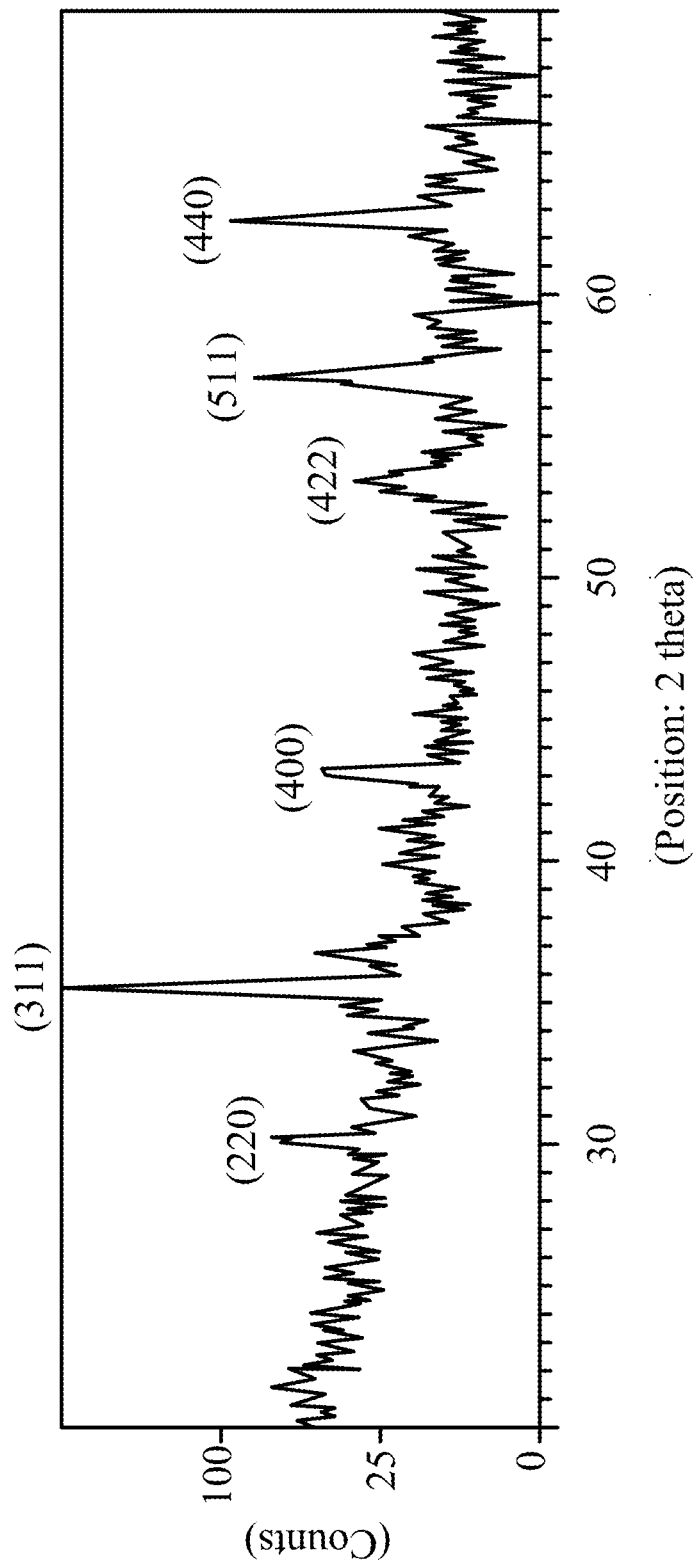
FIG. 2 illustrates an XRD diagram of iron oxide nanorods according to one example of the disclosure.

FIG. 2 illustrates an XRD diagram of the resulting nanorod iron oxide. As shown in FIG. 2, the synthesized iron oxide was $Fe_4O_3$ having a cubic crystalline and six facets represented as (220), (311), (400), (422), (511), and (440) in the XRD diagram.

Figure 3:
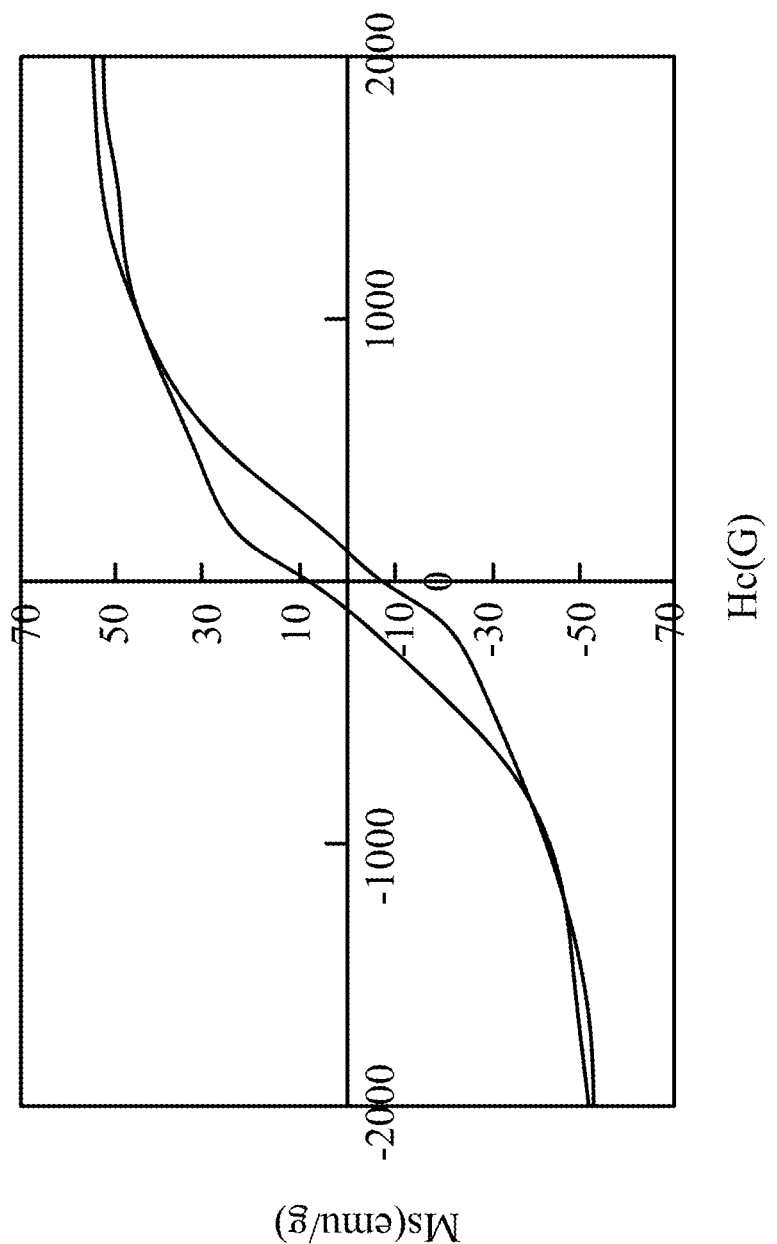
FIG. 3 illustrates a saturated magnetization (Ms) and coercivity (Hc) of iron oxide nanorods according to one example of the disclosure.

FIG. 3 illustrates a saturated magnetization (Ms) and coercivity (Hc) of the resulting nanorod iron oxide analyzed by a vibrating sample magnetometer (VSM). The saturated magnetization (Ms) was 62.9 emu/g, and the coercivity was 122.5 G.

EXAMPLE 2

Figure 4:
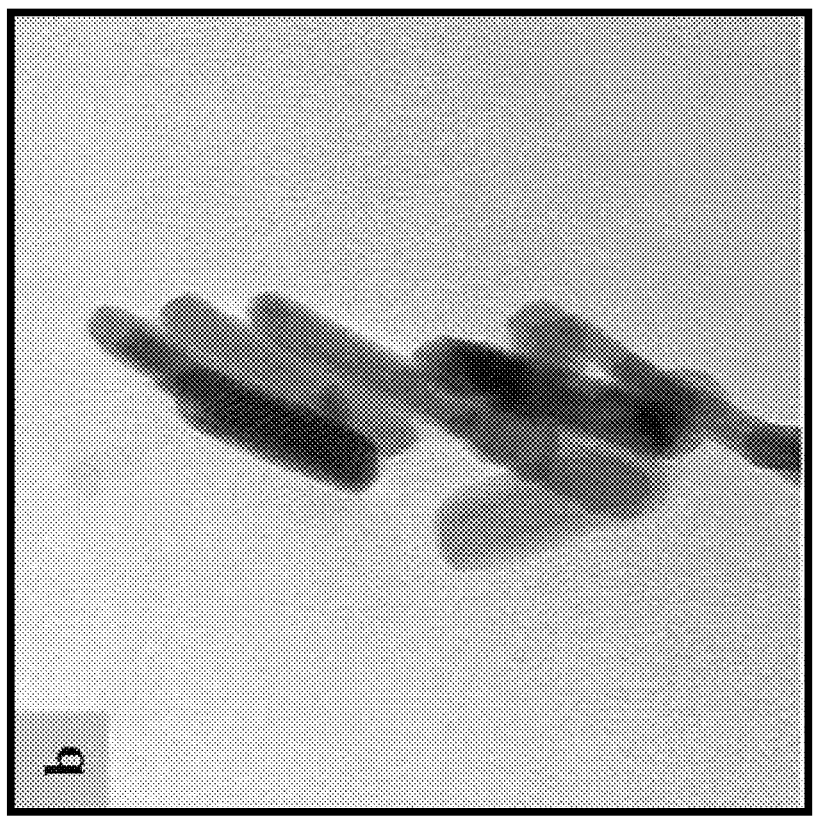
FIG. 4 illustrates an TEM diagram of iron oxide nanorods with a core-shell structure according to one example of the disclosure.

Synthesis of Iron Oxide Nanorods having a Conductive Polymer Shell 0.04 g of the iron oxide nanorods of Example 1 was added into water, and 40 μl of aniline was also added into the solution and stirred. 0.328 g of the ammonium persilfate was dissolved in 0.01M of hydrochloric acid solution as an initiator. Then, the ammonium persilfate solution was added into the iron oxide solution slowly and stirred continuously in an ice bath for 6 hours. The resulting product was $Fe_3O_4$/polyaniline (PANi) particles with a core-shell structure. The product was washed by pure water and then dispersed into water. The resulting $Fe_3O_4$/polyaniline particles with the core-shell structure were then analyzed by a TEM. As shown in FIG. 4, the resulting product had the iron oxide presented with a darker color in the inner part, and a thin layer of aniline presented with a lighter color was coated on the outer layer of the product. This was because the electronic density of the aniline was lower than the electronic density of the $Fe_3O_4$, and thus the color of the aniline presented in the TEM diagram was lighter than the color of the $Fe_3O_4$. In addition, according to the TEM diagram, a thickness of the conductive polymer shell (i.e. PANi) was about 5 nm to 10 nm.

Figure 5:
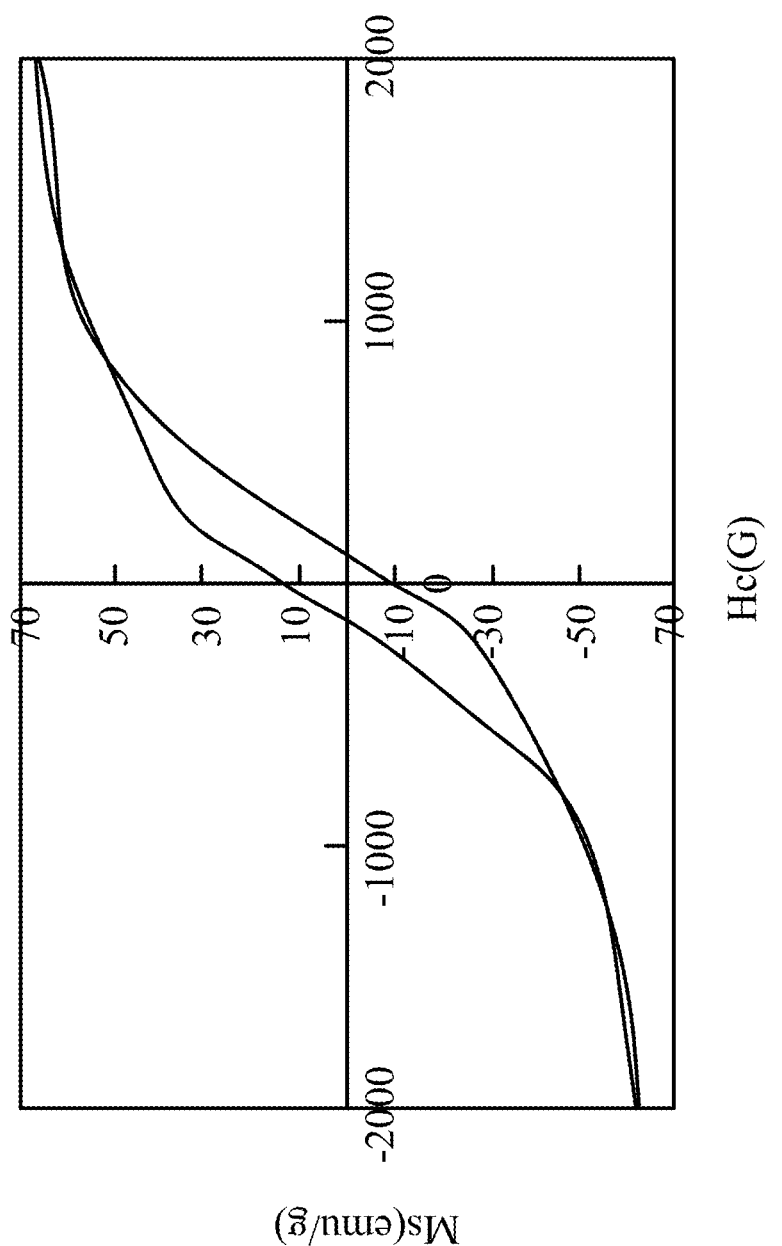
FIG. 5 illustrates a saturated magnetization (Ms) of iron oxide nanorods with a core-shell structure according to one example of the disclosure.

FIG. 5 illustrates a saturated magnetization (Ms) and coercivity (Hc) of the resulting nanorod iron oxide analyzed by a vibrating sample magnetometer (VSM). The saturated magnetization (Ms) was 71.69 emu/g, and the coercivity was 137.09 G. Accordingly, the aniline wrapped onto the iron oxide did not attenuate the magnetic property of the iron oxide.

EXAMPLE 3

Preparation of a Hybrid Slurry-B

The iron oxide nanorods of Example 1 (dispersed in water), a conductive polymer, and 1 wt % of polyvinyl alcohol (PVA) were mixed. The used conductive polymer was poly(3,4-ethylenedioxythiophene):poly(styrenesulfonate) (PEDOT:PSS; purchased from AECONN Technology Corporation) The mixture was sonicated for 30 minutes and then stirred for about 18 hours to form an evenly mixed hybrid slurry.

Three kinds of hybrid slurries were prepared containing different amounts of the iron oxide nanorods, wherein the amounts of the iron oxide nanorods were 1.2 wt % ($B_1$), 6 wt % ($B_2$), and 12 wt % ($B_3$) respectively.

As shown in Table 1, conductivities of the resulting hybrid slurries were 1040 μS/cm ($B_1$), 910 μS/cm ($B_2$), and 715 μS/cm ($B_3$) respectively, as detected by a conductivity meter.

In addition, the hybrid slurries were dried by an oven and the saturated magnetizations (Ms) were analyzed by a vibrating sample magnetometer (VSM). The saturated magnetization (Ms) were 2.32 emu/g ($B_1$), 2.03 emu/g ($B_2$), and 5.14 emu/g ($B_3$) respectively. In addition, after normalization, the saturated magnetizations (Ms) were 193.02 emu/g ($B_1$), 33.87 emu/g ($B_2$), and 21.42 emu/g ($B_3$) respectively. As shown in Table 1, although the iron oxide nanorods itself had good coercivity, its conductivity was poor. By contrast, the hybrid slurries ($B_1$, $B_2$, and $B_3$) formed in Example 3 had both good coercivity and good conductivity.

TABLE 1

| Sample | Iron oxide nanorods | $B_1$ | $B_2$ | $B_3$ |
|---|---|---|---|---|
| Amount of iron oxide(%) | 100% | 1.20% | 6% | 12% |
| Hc (G) | 122.5 | 24.99 | 67.07 | 112.85 |
| Ms (emu/g) | 62.9 | 2.32 | 2.03 | 5.14 |
| Ms after normalization (emu/g) | 62.9 | 193.02 | 33.87 | 21.42 |
| Conductivity (μS/cm) | 22.9 | 1040 | 910 | 715 |

EXAMPLE 4

Preparation of a Hybrid Slurry-C

The iron oxide nanorods having the core-shell structure formed in Example 2 (dispersed in water), PEDOT:PSS, and 1 wt % of polyvinyl alcohol (PVA) were mixed. The mixture was sonicated for 30 minutes and then stirred for about 18 hours to form an evenly mixed hybrid slurry C.

Three kinds of hybrid slurries were prepared containing different amounts of the iron oxide nanorods, wherein the amounts of the iron oxide nanorods were 1.2 wt % ($C_1$), 6 wt % ($C_2$), and 12 wt % ($C_3$) respectively.

As shown in Table 2, conductivities of the resulting hybrid slurries were 1280 μS/cm ($C_1$), 1150 μS/cm ($C_2$), and 990 μS/cm ($C_3$) respectively, as detected by a conductivity meter.

In addition, the hybrid slurries were dried by an oven and the saturated magnetizations (Ms) were analyzed by a vibrating sample magnetometer (VSM). The saturated magnetizations (Ms) were 3.805 emu/g ($C_1$), 4.795 emu/g ($C_2$), and 3.965 emu/g ($C_3$) respectively. In addition, after normalization, the saturated magnetizations (Ms) were 317.08 emu/g ($C_1$), 79.92 emu/g ($C_2$), and 33.04 emu/g ($C_3$) respectively. As shown in Table 2, even when the iron oxide nanorods had the conductive polymer shell wrapped thereon, its conductivity only increased slightly. By contrast, for the hybrid slurries with the conductive polymer shell ($C_1$, $C_2$, and $C_3$), not only was the conductivity increased, the coercivity also increased significantly. A possible reason for the improved EMI shielding ability might be that the paramagnetic α-$Fe_2O_3$ on the surface of the iron oxide nanorods was transformed into the magnetic $Fe_3O_4$ when the conductive polymer shell was wrapped on the surface of the iron oxide nanorods. Therefore, the magnetic property of the whole structure was improved and the EMI shielding ability became more effective.

TABLE 2

| Sample | Iron oxide nanorods | $Fe_3O_4$/PANi | $C_1$ | $C_2$ | $C_3$ |
| --- | --- | --- | --- | --- | --- |
| Amount of iron oxide (%) | 100 | 86.45 | 1.20 | 6 | 12 |
| Hc (G) | 122.5 | 137.09 | 128.16 | 128.87 | 136.94 |
| Ms (emu/g) | 62.9 | 71.69 | 3.805 | 4.795 | 3.965 |
| Ms after normalization (emu/g) | 62.9 | 82.93 | 317.08 | 79.92 | 33.04 |
| Conductivity (μS/cm) | 22.9 | 101 | 1280 | 1150 | 990 |

COMPARATIVE EXAMPLE 1

Preparation of a Hybrid Slurry-$S_1$ 4 ml of $FeCl_3$ (1M) and 1 ml of $FeCl_2$ (2M) were placed in a beaker. Sodium hydroxide (1M; NaOH) was then added into the beaker slowly until a pH value of the solution reached 12. The resulting product was washed by water, and then cetyltrimethylammonium bromide (CTAB) was added therein as a protecting reagent. The product was then dissolved in 50 ml of pure water and sonicated for 30 minutes. Then, 70 g of the conductive polymer and 1 wt % of polyvinyl alcohol (PVA) was also added into the solution. The used conductive polymer was poly(3,4-ethylenedioxythiophene):poly(styrenesulfonate) (PEDOT:PSS) The mixture was sonicated for 30 minutes and then stirred for about 18 hours to form an evenly mixed hybrid slurry.

EXAMPLE 5

Hybrid Slurries Apply to EMI Shielding

Figure 6:
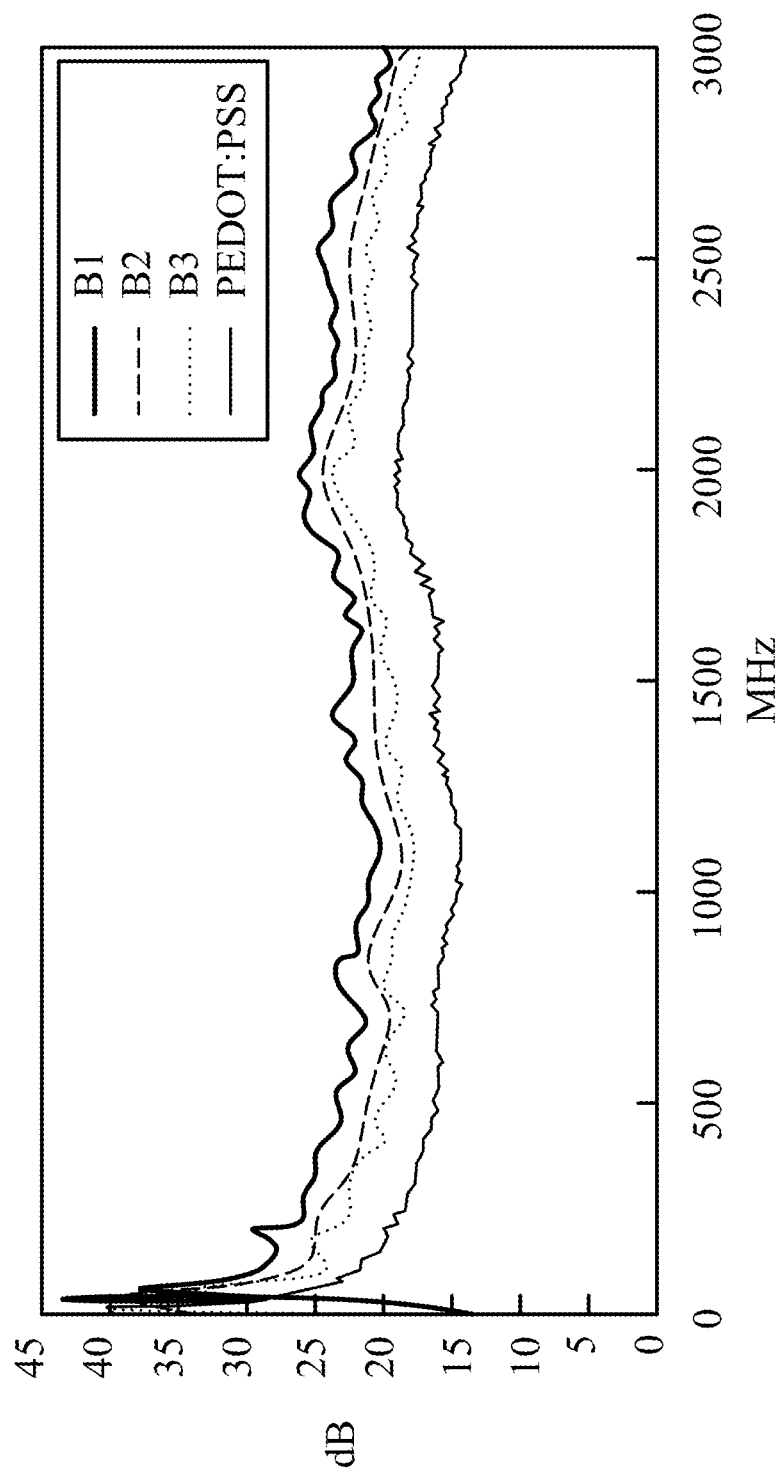
FIG. 6-8 illustrates EMI shielding ability of the composite material according to various examples of the disclosure.

The hybrid slurries $B_1$, $B_2$, and $B_3$ (Examples 3) were placed in flasks respectively, and were debubbled by sonicating under vacuum. After debubbled, the hybrid slurry was added into a mold and dried at 50° C. in an oven to form a thin film with a size of 15 cm×15 cm×40 cm. An EMI value of the resulting film was detected and is shown in FIG. 6. As shown in FIG. 6, the hybrid slurry formed by both conductive polymer and the iron oxide nanorods had better EMI shielding ability, when compared to when only the conductive polymer was used.

Figure 7:
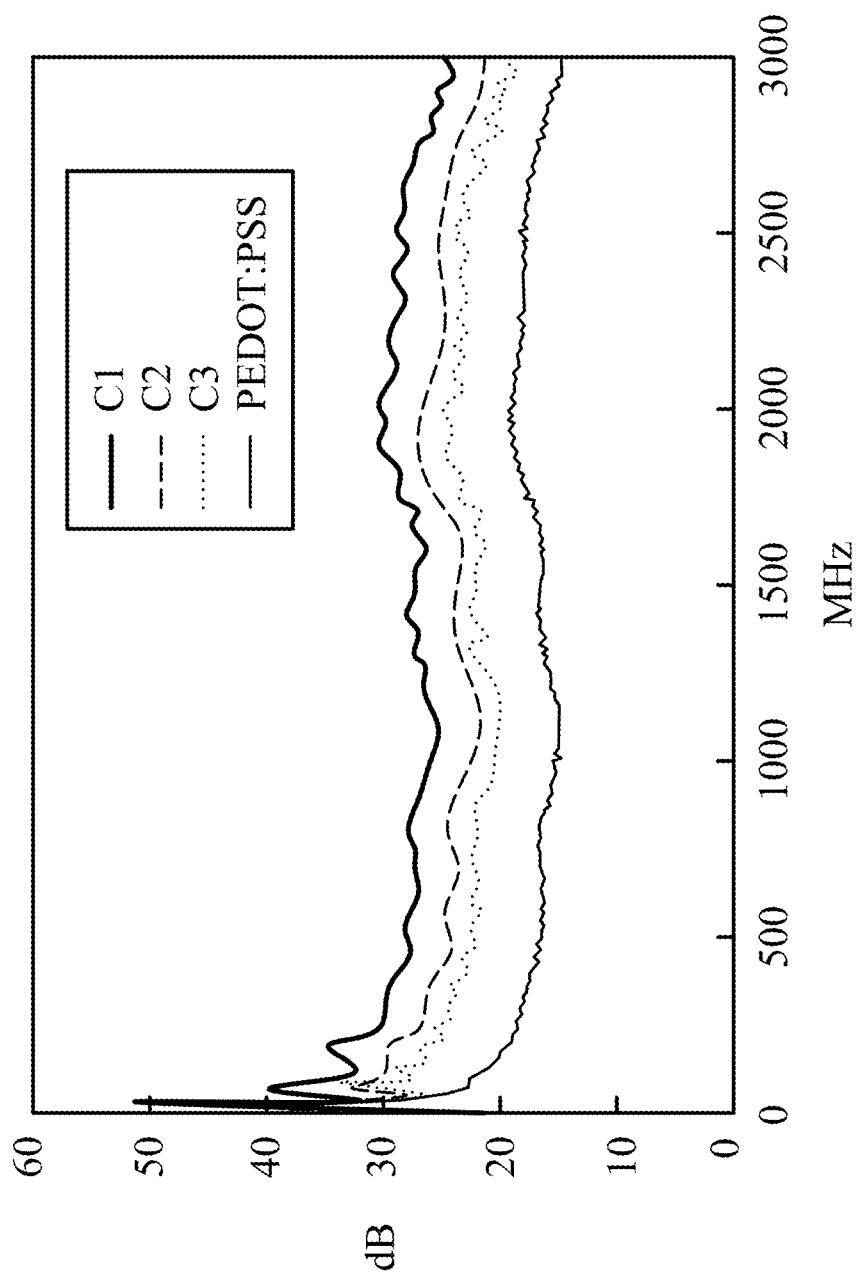

In addition, thin films of the hybrid slurries $C_1$, $C_2$, and $C_3$ with a size of 15 cm×15 cm×40 μm were also formed according to the method described previously. EMI values of the resulting films were detected and are shown in FIG. 7. As shown in FIG. 7, the hybrid slurry formed by both the conductive polymer and the iron oxide nanorods with the core-shell structure had better EMI shielding ability, when compared to only the conductive polymer was used.

Figure 8:
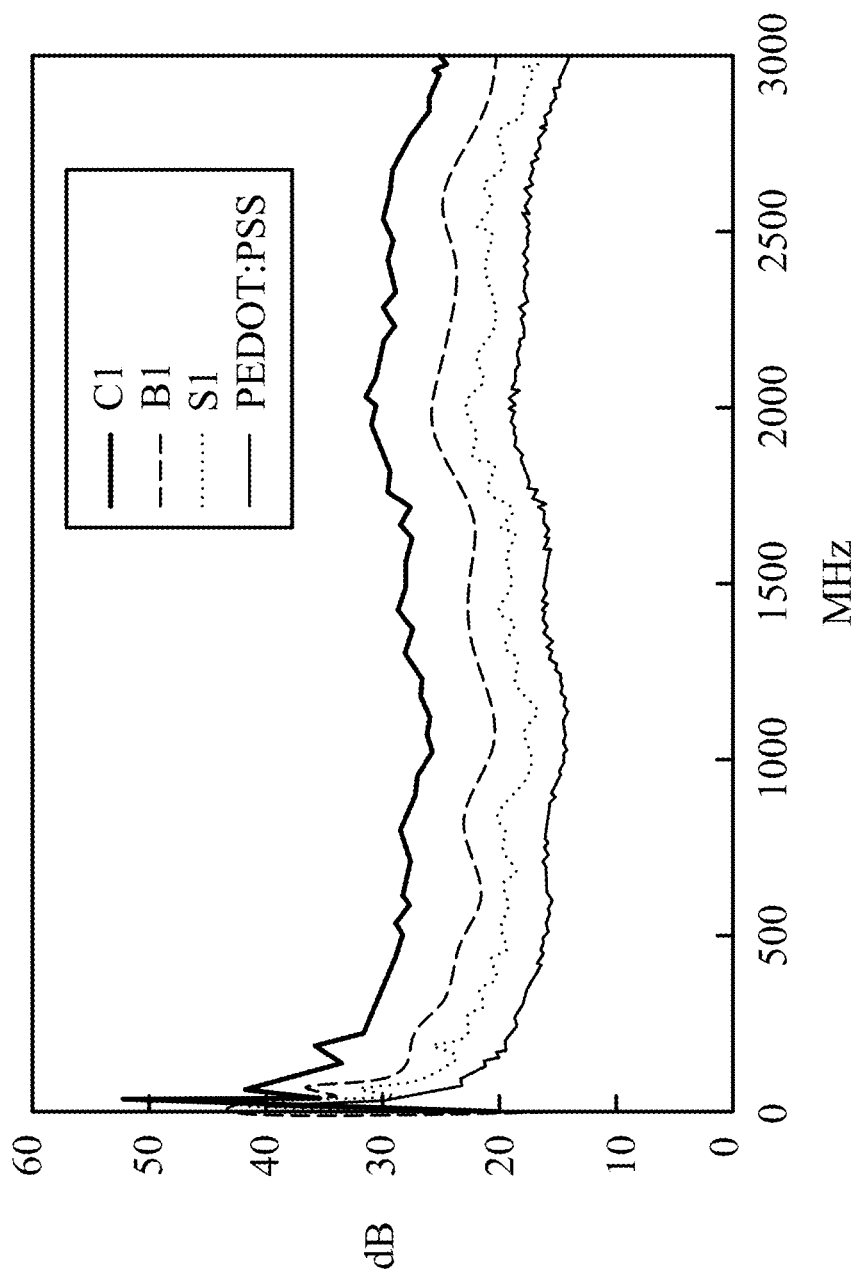

Finally, thin films of the hybrid slurry $B_1$ of Example 3 (including the iron oxide nanorods and the conductive polymer), hybrid slurry $C_1$ of Example 4 (including the iron oxide nanorods with the core-shell structure and the conductive polymer), hybrid slurry $S_1$ of Comparative Example 1 (including the iron oxide nano-spheres and the conductive polymer), and pure PEDOT:PSS were formed according to the method described previously. EMI values of the resulting films were detected and are shown in FIG. 8. As shown in FIG. 8, the hybrid slurry $C_1$ formed by the conductive polymer and the iron oxide nanorods with the core-shell structure had the best EMI shielding ability, and the hybrid slurry $B_1$ formed by the conductive polymer and the iron oxide nanorods had the second best EMI shielding ability.

On the other hand, the hybrid slurry $S_1$ (formed by the conductive polymer and the iron oxide nano-spheres) and the conductive polymer PEDOT:PSS both had poor EMI shielding ability.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A composite material with conductive and ferromagnetic properties, comprising:
   5 to 90 parts by weight of a conductive polymer matrix, wherein the conductive polymer matrix comprises poly (3,4-ethylenedioxythiophene)-polystyrene sulfonate; and
   0.1 to 40 parts by weight of iron oxide nanorods, wherein the iron oxide nanorods are ferromagnetic and have a length-to-diameter ratio of larger than 3, wherein a conductive polymer shell wraps around a surface of the iron oxide nanorods to form a core-shell structure, and wherein the conductive polymer shell comprises polyaniline.

2. The composite material with conductive and ferromagnetic properties as claimed in claim 1, wherein the iron oxide nanorods comprise $Fe_3O_4$, γ-$Fe_2O_3$, or combinations thereof.

3. The composite material with conductive and ferromagnetic properties as claimed in claim 1, wherein the lengthto-diameter ratio of the iron oxide nanorods is between 5 and 10, and a diameter of the iron oxide nanorods is between 10 nm and 100 nm.

4. The composite material with conductive and ferromagnetic properties as claimed in claim 1, wherein a saturation magnetization of the iron oxide nanorods is between 2emu/g and 90 emu/g, and a coercivity of the iron oxide nanorods is between 0.5 G and 200 G.

5. The composite material with conductive and ferromagnetic properties as claimed in claim 1, wherein a thickness of the conductive polymer shell is between 5 nm and 50 nm.

6. The composite material with conductive and ferromagnetic properties as claimed in claim 1, wherein the composite material with conductive and ferromagnetic properties is formed as a film.

7. The composite material with conductive and ferromagnetic properties as claimed in claim 6, wherein a surface resistance of the film is between 1 and 1000Ω/□.

8. The composite material with conductive and ferromagnetic properties as claimed in claim 1, further comprising 0.5 to 85 parts by weight of an adhesive.

9. The composite material with conductive and ferromagnetic properties as claimed in claim 8, wherein the adhesive comprises polyvinyl alcohol, polyacrylic acid, polyurethane, epoxy resin, polymethylmethacrylate, acrylonitrile butadiene styrene, or combinations thereof.

10. The composite material with conductive and ferromagnetic properties as claimed in claim 1, wherein the composite material with conductive and ferromagnetic properties is used for EMI shielding, radar/microwave absorption, or electro static discharge (ESD).

* * * * *